(12) United States Patent
Karppi et al.

(10) Patent No.: US 10,358,504 B2
(45) Date of Patent: Jul. 23, 2019

(54) PROCESS FOR PRODUCING MICROCELLULOSE

(75) Inventors: Asko Karppi, Turku (FI); Veli-Matti Vuorenpalo, Espoo (FI); Leif Robertsen, Parainen (FI); Kari Parviainen, Espoo (FI); Olli Dahl, Tervakoski (FI); Kari Vanhatalo, Helsinki (FI)

(73) Assignee: Kemira OYJ, Helsinki (FI)

(*) Notice: Subject to any disclaimer, the term of this patent is extended or adjusted under 35 U.S.C. 154(b) by 593 days.

(21) Appl. No.: 13/697,726

(22) PCT Filed: Jun. 6, 2011

(86) PCT No.: PCT/FI2011/050525
§ 371 (c)(1),
(2), (4) Date: Jan. 17, 2013

(87) PCT Pub. No.: WO2011/154599
PCT Pub. Date: Dec. 15, 2011

(65) Prior Publication Data
US 2013/0112193 A1    May 9, 2013

(30) Foreign Application Priority Data

Jun. 7, 2010   (FI) .................................... 20105640

(51) Int. Cl.
*C08B 15/02*   (2006.01)

(52) U.S. Cl.
CPC .................................... *C08B 15/02* (2013.01)

(58) Field of Classification Search
None
See application file for complete search history.

(56) References Cited

U.S. PATENT DOCUMENTS

| | | | |
|---|---|---|---|
| 3,954,727 A | 5/1976 | Toshkov et al. | |
| 4,126,706 A * | 11/1978 | Hilton | 426/438 |
| 5,401,361 A * | 3/1995 | Prough et al. | 162/17 |
| 5,820,830 A * | 10/1998 | McIlroy et al. | 422/168 |
| 6,096,152 A * | 8/2000 | Anderson | B31F 1/12 |
| | | | 156/183 |
| 6,228,213 B1 * | 5/2001 | Hanna et al. | 162/18 |
| 7,037,405 B2 * | 5/2006 | Nguyen et al. | 162/25 |
| 2003/0089465 A1 * | 5/2003 | Schaible | C08B 15/02 |
| | | | 162/19 |
| 2004/0226671 A1 * | 11/2004 | Nguyen et al. | 162/25 |
| 2005/0239744 A1 * | 10/2005 | Ioelovich et al. | 514/57 |
| 2006/0219376 A1 * | 10/2006 | Luo | C08B 15/02 |
| | | | 162/87 |
| 2010/0291161 A1 * | 11/2010 | Obae et al. | 424/400 |

FOREIGN PATENT DOCUMENTS

| | | | |
|---|---|---|---|
| WO | 1999015564 A1 | | 4/1999 |
| WO | WO0202643 | * | 1/2002 |
| WO | 2010131088 A1 | | 11/2010 |
| WO | WO2010131088 | * | 11/2010 |

OTHER PUBLICATIONS

"The reactivity of prehydrolyzed softwood draft pulps after prolonged cooking followed by chlorite delignification" Javed et al BioResources vol. 6, issue 3, pp. 2581-2591, 2011.*
"Comparative study of cellulose fragmentation by enzymes and ultrasound" Gama et al. Enzyme and microbial technology, vol. 20, pp. 12-17, 1997.*
Solid-Liquid Mixing in Mechanically Agitated Vessels Dissertation, pp. 1-248, 1992 Department of Chemical and Biochemical Engineering University College, London.*
Chemical Pulping Gullichsen et al. Book 6A, pp. 1-52, 1999.*
Rydholm, "Pulping Process," Interscience Publishers, 1965, pp. 649-672.
International Preliminary Report on Patentability dated Aug. 22, 2012.
Finland Search Report dated Mar. 18, 2011.
International Search Report and Written Opinion dated Nov. 28, 2011.

* cited by examiner

*Primary Examiner* — Douglas B Call
(74) *Attorney, Agent, or Firm* — Thomas|Horstemeyer, LLP

(57) ABSTRACT

The present invention relates to a process for producing microcellulose comprising subjecting fibrous cellulosic material to acid hydrolysis at a temperature from 10° C. to less than 140° C. and at a consistency of at least 8% on dry weight of the cellulose, wherein the amount of added acid is from 0.2 to 2%, preferably from 0.3 to 1.9%, more preferably from 0.5 to 1.5% on dry weight of the cellulose.

30 Claims, 1 Drawing Sheet

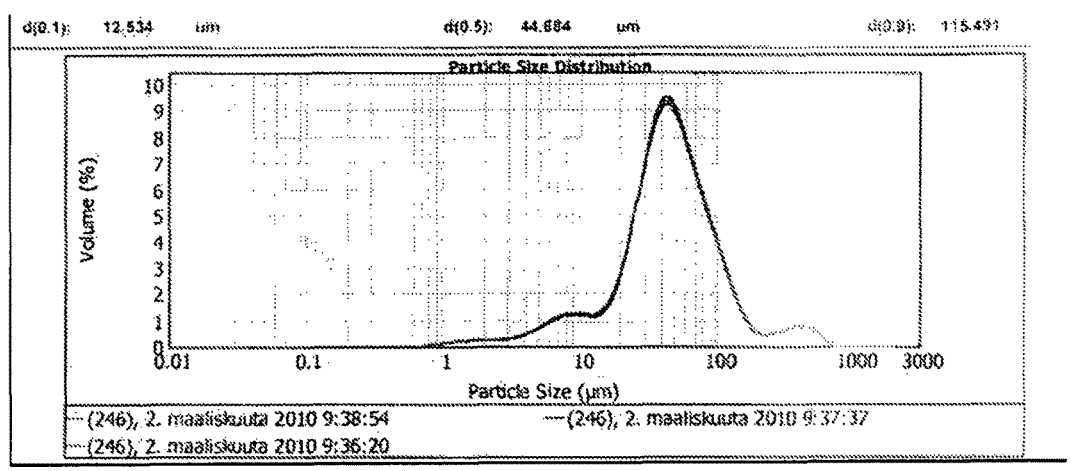

PROCESS FOR PRODUCING
MICROCELLULOSE

CROSS REFERENCE TO RELATED
APPLICATION

This application is the 35 U.S.C. § 371 national stage of PCT application entitled "Process for Producing Microcellulose," having serial number PCT/FI2011/050525, filed on 6 Jun. 2011, which claims priority to Finland Application No. 20105640, filing date Jun. 7, 2010, which is incorporated by reference in its entirety.

FIELD OF THE INVENTION

The present invention relates to a process for preparing microcellulose in high yield by acid hydrolysis of fibrous cellulosic material.

BACKGROUND OF THE INVENTION

Microcellulose (also named as e.g. level-off DP cellulose and microcrystalline cellulose) is a versatile product in many industrial applications, e.g. in food, pharmaceutical, cosmetics, paper and board and many other applications. Microcellulose can also be used in the production of derivatives of microcellulose, such as viscose cellulose, CMC, nanocellulose and various composite products.

Several methods have been proposed in the patent literature for producing micro-cellulose.

U.S. Pat. No. 2,978,446 describes the production of level-off DP (degree of polymerization) cellulose by acid hydrolysis and mechanical treatment. Cellulose is hydrolyzed with boiling in 2.5 normal hydrochloric acid (HCl). Acid concentration is thus 9% and temperature about 105° C. The consistency of the pulp and the amount of added acid are not specified. The method requires subsequent to acid hydrolysis mechanical disintegration in aqueous medium. It is obvious that high dosages of acid and extensive mechanical treatment have prevented the development of any reasonable production economy.

U.S. Pat. No. 3,278,519 describes a similar method for producing level-off DP cellulose by hydrolyzing cellulose either with 2.5 normal HCl at 105° C. or with 0.5% HCl at 250° F. (121° C.). The consistency of the pulp and the amount of added acid are not specified. This patent also describes a harsh energy-consuming mechanical treatment.

U.S. Pat. No. 3,954,727 discloses a method for producing microcrystalline cellulose by hydrolyzing cellulose with dilute sulphuric acid at a temperature of from 120 to 160° C. The dilute sulphuric acid to which the cellulose is added has a concentration of 1% and the cellulose-acid mass has a concentration of 5%. Thus, the consistency of the pulp is low, the heating demand is therefore high and the amount of acid based on the dry weight of the cellulose becomes high. This makes the process expensive and complicated.

U.S. Pat. No. 7,037,405 describes a method, in which raw pulp material is contacted with acid and heated at elevated temperature and then treated mechanically. A suitable acid concentration is mentioned to be 1-5% of the mixture, a suitable pulp consistency 3-50%, a suitable temperature range 80-120° C. and a suitable reaction time 30 min-4 h. After acid hydrolysis the pulp mixture is treated mechanically for disintegration of the fibres. Preferably the mechanical disintegration process step shears the crystalline cellulose particles into micron size ranging form about 1 to 10 micron size. The process of U.S. Pat. No. 7,037,405 suffers of complicated production process. Mechanical disintegration step is required after acid hydrolysis. This stage requires in production costly refiner unit and high refining energy of 5-100 kWh/ton.

U.S. Pat. No. 6,228,213 discloses a process for producing microcrystalline cellulose by adding an acid solution to cellulose and feeding the cellulose and acid solution through an extruder, wherein the cellulose undergoes acid hydrolysis and forms microcrystalline cellulose. The temperature of the extruder barrel during the hydrolysis is from 80 to 200° C. Due to the temperature of the extruder and the pressure created by the die or screw of the extruder, the cellulose melts in the extruder, which allows for more intimate contact between the cellulose and the acid. The compression ratio of the extruder screw is between 1.5:1 and 3:1, preferably about 3:1. Disadvantages with extruders are that they are expensive, the maintenance costs are rather high, and they require a high mechanical energy input, by estimation at least 100 kWh, typically at least 150 kWh per dry ton cellulose (the heating energy input is excluded).

U.S. Pat. No. 5,543,511 describes the production of level-off-DP cellulose using partial hydrolysis with oxygen and/or carbon dioxide at 100-200° C.

U.S. Pat. No. 4,427,778 describes the production of level-off-DP cellulose by enzymatic hydrolysis.

Acid hydrolysis is also widely used in dissolving pulp production, e.g. in acidic bisulphite cooking and as a prehydrolysis step is used in the kraft process. Acidic bisulphite cooking is described in e.g. Rydholm, S. E., Pulping Processes, pp. 649 to 672. U.S. Pat. No. 5,589,033 describes a pre-hydrolysis kraft process of lignin-containing cellulosic material (i.e. wood chips) at 100-160° C. for softwoods and at 120-180° C. for hardwoods for 10-20 min. Neutralization and alkaline kraft cooking follows the pre-hydrolysis step. The final product is a pulp with high alpha cellulose purity and can be used as dissolving pulp. Dissolving pulp has a fibrous structure with fiber length of typically 0.5 mm to 2.5 mm dependent on wood raw material. Thus, the physical dimensions are much larger than microcellulose.

In the prior-art microcellulose manufacturing processes high amounts of chemicals such as acids calculated on dry weight of the cellulose are used.

In view of the above described processes for producing microcellulose there is a need for an even more efficient and economical process.

SUMMARY OF THE INVENTION

According to the present invention it was surprisingly found that microcellulose with rather narrow particle size distribution can be produced in high yields from fibrous cellulosic material by mild acid hydrolysis at a high consistency of at least 8% and a temperature of less than 140° C. The particle size distribution can be easily controlled by varying the conditions of the mild acid hydrolysis.

BRIEF DESCRIPTION OF THE DRAWING

FIG. 1 shows the particle size distribution curve of microcellulose produced according to the present invention at 120° C. and acid dose of 1.5%.

DETAILED DESCRIPTION OF THE
INVENTION

According to the present invention there is provided a process for producing microcellulose comprising subjecting fibrous cellulosic material to acid hydrolysis at a temperature from 110° C. to less than 140° C. and at a consistency of at least 8% on dry weight of the cellulose, wherein the amount of added acid is from 0.2 to 2%, preferably from 0.3 to 1.9%, more preferably from 0.5 to 1.5% on dry weight of the cellulose.

As used in this specification the term "microcellulose" includes microcrystalline cellulose MCC but refers also to similar products which are not totally crystalline but may contain some amorphous regions. The microcellulose of the present invention typically has a hemicellulose content of about 2 to 13%, preferably about 4 to 10% by weight measured by typical carbohydrate analysis methods (Determination of hemicelluloses and pectins in wood and pulp fibres by acid methanolysis and gas chromatography, 1996, Nordic pulp and paper research journal nro 4, 1996. s. 216-219).

Suitable acids for the hydrolysis are both organic and inorganic acids. The organic acid may be e.g. formic acid or acetic acid. Preferred acids are mineral acids, such as sulphuric acid, hydrochloric acid, nitric acid, sodium bisulphate or sodium bisulphite. Also mixtures of two or more of these acids may be used. A preferred mineral acid is sulphuric acid.

Preferably the hydrolysis is carried in a reactor without essential compression, the compression ratio of the reactor preferably being below 1.5:1, more preferably below 1.2:1.

The hydrolysis temperature is preferably between 110 and 135° C., more preferably between 115 and 135° C.

The consistency of the cellulosis material during the hydrolysis is preferably from 8 to 50%, more preferably from 15 to 50%, even more preferably from 20 to 50%, and most preferably from 25 to 45% on dry weight of the cellulose.

The hydrolysis time is preferably from 5 to 180 minutes, more preferably from 15 to 150 minutes.

Preferably the mechanical energy input during the hydrolysis is provided to ensure even chemical and temperature distribution and without essential mechanical cutting and mechanical defibration of the cellulose matrix, preferably at most 20 kWh per dry ton cellulose, more preferably at most 10 kWh per dry ton cellulose, and most preferably between 1 and 5 kWh per dry ton cellulose.

According to the invention the fibrous cellulosic material and the acid are contacted with each other, preferably by mixing.

After the acid hydrolysis the obtained microcellulose-hydrolysate mixture may be neutralized or the microcellulose may be separated from the hydrolysate. The separated microcellulose may be washed and the separated or washed microcellulose may be neutralized. Also the acid hydrolysate may be neutralized. E.g. sodium carbonate, sodium bicarbonate, potassium hydroxide, magnesium hydroxide or sodium hydroxide may be used for the neutralization.

It has been observed that microcellulose material with an average particle size of about 30-100 μm can be produced in high yield from fibrous cellulosic material by mild acid hydrolysis at a consistency of at least 8% and at a temperature of less than 140° C. without a subsequent disintegration step. An essential feature of the present invention is the high consistency of the cellulosic material, which is at least 8%, preferably at least 20% on dry weight of the cellulose. The high consistency increases the concentration of the chemicals which has a favourable effect on the reaction speed. In addition, the heating demand will be lower.

The fibrous cellulosic material used as a starting material in the process of the present invention may be any cellulosic material that can be hydrolyzed under the specified conditions. The fibrous cellulosic material does not necessarily have to be a pure cellulosic material but it can also contain other materials such as lignin.

The lignin content of the fibrous cellulosic starting material is preferably at most 5%, more preferably at most 2%, most preferably at most 1%.

The fibrous cellulosic starting material typically has a hemicellulose content of about 3 to 15%, preferably 5 to 10% by weight measured by typical carbohydrate analysis methods (Determination of hemicelluloses and pectins in wood and pulp fibres by acid methanolysis and gas chromatography. 1996. Nordic pulp and paper research journal nro 4, 1996. p. 216-219).

The fibre length of the fibrous cellulosic raw material is preferably 5-0.2 mm. For non-wood fibrous cellulosic materials, such as cotton the fibre length may be more than 5 mm.

The fibrous cellulosic material may be derived from wood plant material, such as softwoods or hardwoods.

A preferred fibrous cellulosic material is a bleached or unbleached chemical pulp, such as kraft pulp, soda-AQ pulp, sulfite pulp, neutral sulfite pulp, acid sulfite pulp or an organosolv pulp. The pulp may be softwood or hardwood pulp. The pulp may be a pulp obtained immediately after the digestion or a pulp that has been delignified after the digestion or a pulp that has been delignified and bleached. A preferred delignified pulp is an $O_2$ delignified pulp. A preferred pulp is fully bleached pulp.

According to the present invention it is also possible to use fibrous cellulosic material obtained from non-wood lignocellulosic plant materials such as cotton, grass, bagasse, straws of grain crops, flax, hemp, sisal, abaca or bamboo. Usually these plant materials are treated with an alkaline substance to break the lignocellulosic material into cellulose, lignin and hemicellulose followed by separating the cellulose from the mixture. Some lignin-poor plant materials, such as cotton linters or cotton textiles do not necessarily require a treatment with an alkaline substance. The latter materials may contain more than 90% cotton fibres of the fibrous material The fibrous cellulosic material, such as chemical pulp preferably has a lignin content of below 40 kappa number, more preferably below 30 kappa number, and most preferably below 10 kappa number.

According to a preferred embodiment of the invention the produced microcellulose has an average particle size (D50) of 30-100 μm, and preferably the particle size distribution (D90) is such that at least 90% by volume of the particles have a size of below 250 μm, preferably below 200 μm and more preferably below 150 μm. The particle size was determined by the procedure described later on in this specification which procedure includes ultrasonic treatment which might cause deagglomerization or disintegration of the sample.

The microcellulose material obtained by the process of the invention typically has an average particle size between 30-100 μm, preferably between 40-80 μm—as determined by the procedure described later on in this specification—without any mechanical treatment. It is possible to refine the structure if finer particle size is required. Thus, the microcellulose material obtained from the hydrolysis may, if desired, be refined to a smaller particle size by using suitable devices, such as friction grinders wherein the refining is effected by grinding stones (e.g. Masuko grinder), high shear mixers or jet mills.

A benefit of the process of the invention is that the drainability of the final microcellulose is good and that the product can be easily washed to remove low molecular weight carbohydrates.

As set forth above the microcellulose is obtained in high yields by the process of the present invention. The yield is preferably at least 90%, more preferably at least 95%.

According to the present invention the microcellulose may be produced in any suitable equipment wherein the cellulose-acid mixture is not subjected to any substantial compression, such as a vessel equipped with a mixer or screw conveyor.

The latter one may be a device of the M&D digester type having a screw conveyor. Other devices may be continuous bleaching reactors or down-flow continuous digesters, e.g. of type Kamyr. The compression ratio, if any, is typically below 1.5:1, more preferably below 12:1.

EXPERIMENTAL SECTION

The following examples to produce microcellulose describe the procedure according to invention. The cooking experiments were done with an air-bath-digester, manufactured by Haato Oy. The air-bath-digester consists of six separate autoclave units, which all have a volume of 2.5 liter. The units are heated with hot air. Air is heated with an electric resistor and the heated air is circulated with a fan.

All of the cooking experiments were done in the following manner. The cellulose material, pulp or other, was put in an autoclave unit. Pulp in bale sheets was cut in square pieces with edge of about 1-2 cm prior to loading to autoclave unit. Fresh cellulose material, e.g. unbleached pulp, was dried to consistency of 45-50% and then homogenized with Kenwood household mixer for 5 min, prior to loading into autoclave unit. Acid solution was dosed after cellulose material. Acid was first pre-mixed with de-ionized water and the aqueous acid solution was poured evenly on the pulp. The lid of the autoclave unit was closed and the unit was heated to 80° C. The pre-heating stage took about 20 min in each test. When 80° C. start temperature had been reached, the real heating stage started. The autoclave unit was heated in a controlled manner with heating speed of 2° C./min until the cooking temperature target had been reached. Thus heating e.g. to 120° C. took 20 min and to 140° C. took 30 min. Cooking time started, when the target cooking temperature had been reached. Temperature was kept at the target temperature value during the whole cooking time. When cooking time was completed, the autoclave unit was immediately removed and cooled with cold water (temperature about 10° C.).

Cooled autoclave unit was opened and the cellulose mixture was put into a filter bag (mesh 90). The excess acid solution in the mixture was removed with a spin dryer (Manufacturer UPO. Drying time 2 min, speed about 2800 rpm). Consistency after spin dryer treatment was 45-50%. The cellulose material was then washed with 3 liter of de-ionized water, by first mixing the mixture gently for 5 min and drying the mixture with spin dryer to consistency of 45-50%. The washing step with de-ionized water was repeated two times. pH in the last (third) aqueous mixture was about 6-7 and washing was considered to be complete.

The washed cellulose material was weighed. Three samples, each about 20 g were taken, combined and weighted. The combined samples were dried in an oven (105° C., 24 h). Using the moisture value of the sample the total amount of dry (absolute) cellulose material was calculated. Process yield was calculated using the amount of dry cellulose material of the washed product and the dry cellulose material in the start.

Particle sizes of the cellulose products were determined by laser diffraction with Mastersizer 2000 (made by Malvern Instruments Ltd) equipped with a wet dispersion unit Hydro 2000MU. The determinations were done according to the following procedure:

A sample of the cellulosic material was dispersed in 500 ml of distilled water. The sample concentration was adjusted in a manner that the obscuration was 10%. Pump/stir rate of the dispersion unit was adjusted to 1500 rpm. The sample was treated with ultrasonic for 60 sec prior to the particle size measurement. Particle sizes were measured in 3 sequential measurements in 60 sec intervals. The average value of three measurements was calculated. Background was measured each time prior to the sample. The measuring time for each background and each sample measurements was 5 sec. The measurements were done using Fraunhofer parameters. More data for laser diffraction measurement principles are presented in Master sizer 2000 application note MRK 561 (Wet method development for laser diffraction measurements) by Malvern Instruments and ISO-13320-1 (1:1999), Particle size analysis—Laser diffraction General Principles.

Example 1 Acid Hydrolysis of Fully Bleached Pulp, Acid Dosage of 1.5 or 2.0% (of Dry Pulp), Cooking Temperature 120° C.

A series of hydrolysis experiments was done with fully bleached softwood pulp (moisture 10%). The parameters and the results of this example are presented in table 1. Particle size distribution curve of experiment 8-5 is presented in FIG. 1.

TABLE 1

| Exp. | Sulphuric acid dosage (%) | Cooking time (min) | Temperature (° C.) | Consistency (%) | Yield (%) | Average particle size (μm) | Particle size, 90% (μm) |
|---|---|---|---|---|---|---|---|
| 8-1 | 1.5 | 150 | 120 | 20 | 97 | 56 | 164 |
| 8-2 | 2.0 | 150 | 120 | 20 | 97 | 49 | 134 |
| 8-3 | 1.5 | 90 | 120 | 30 | 97 | 55 | 154 |
| 8-4 | 2.0 | 90 | 120 | 30 | 97 | 44 | 112 |
| 8-5 | 1.5 | 150 | 120 | 30 | 96 | 45 | 115 |
| 8-6 | 2.0 | 150 | 120 | 30 | 91 | 41 | 102 |

The results show that when pulp is cooked with low acid concentration at 120° C. even for long times, the yield of the microcellulose is very good, over 90%. For certain microcellulose applications the obtained product can be used without refining. Over 10% of the particles have particle size over 100 μm and thus for certain microcellulose applications refining might be necessary.

The invention claimed is:

1. A process for producing microcellulose comprising:
subjecting fibrous cellulosic material having fibre length of 0.2-5 mm, lignin content of 5% or less, and hemicellulose content from 3 to 15% by weight to acid hydrolysis at a temperature from 110° C. to less than 140° C. and at a consistency of at least 8% on dry weight of the fibrous cellulosic material,
wherein the amount of added acid is from 0.5 to 1.5% on dry weight of the fibrous cellulosic material,
wherein the acid hydrolysis is carried in a reactor comprising a mixer, wherein the produced microcellulose has an average size of 30-100 µm,
wherein the produced microcellulose is obtained without a subsequent mechanical treatment step; and
wherein a yield of the microcellulose is at least 90%.

2. The process according to claim 1, wherein the added acid comprises a mineral acid.

3. The process according to claim 1, wherein a compression ratio of the reactor is below 1.5:1.

4. The process according to claim 1, wherein the temperature is between 110 and 135° C.

5. The process according to claim 1, wherein the consistency of the fibrous cellulosic material is from 8 to 50%.

6. The process according to claim 1, wherein the acid hydrolysis time is from 5 to 180 minutes.

7. The process according to claim 1, wherein the fibrous cellulosic material and the added acid are mixed with each other.

8. The process according to claim 1, wherein the obtained microcellulose is neutralized or the microcellulose is separated from a hydrolysate, the separated microcellulose is optionally washed and the separated or washed microcellulose is neutralized, or the separated hydrolysate is neutralized.

9. The process according to claim 1, wherein the fibrous cellulosic material is derived from wood plant material.

10. The process according to claim 1, wherein the fibrous cellulosic material comprises bleached or unbleached chemical pulp.

11. The process according to claim 1, wherein the fibrous cellulosic material is derived from non-wood plant material.

12. The process according to claim 1, wherein the fibrous cellulosic material, has a lignin content of below a kappa number of 40.

13. The process according to claim 1, wherein the added acid comprises at least one of sulphuric acid, hydrochloric acid or nitric acid.

14. The process according to claim 1, wherein a compression ratio of the reactor is below 1.2:1.

15. The process according to claim 1, wherein the temperature is between 115 and 135° C.

16. The process according to claim 1, wherein the consistency of the fibrous cellulosic material is from 15 to 50% on dry weight of the fibrous cellulosic material.

17. The process according to claim 1, wherein the consistency of the fibrous cellulosic material is from 20 to 50% on dry weight of the fibrous cellulosic material.

18. The process according to claim 1, wherein the consistency of the fibrous cellulosic material is from 25 to 45% on dry weight of the fibrous cellulosic material.

19. The process according to claim 1, wherein the acid hydrolysis time is from 15 to 150 minutes.

20. The process according to claim 1, wherein the fibrous cellulosic material is derived from at least one of a softwood or hardwood.

21. The process according to claim 1, wherein the fibrous cellulosic material comprises at least one of: kraft pulp, soda-AQ pulp, sulfite pulp, neutral sulfite pulp, acid sulfite pulp or organosolv pulp.

22. The process according to claim 1, wherein the fibrous cellulosic material is derived from at least one of: cotton, grass, bagasse, straws of grain crops, flax, hemp, sisal, abaca or bamboo.

23. The process according to claim 1, wherein the fibrous cellulosic material has a lignin content of below a kappa number of 30.

24. The process according to claim 1, wherein the fibrous cellulosic material has a lignin content of below a kappa number of 10.

25. The process according to claim 1, wherein a yield of the microcellulose is at least 95%.

26. The process according to claim 1, wherein at least 90% by volume of the produced microcellulose has a size below 250 µm.

27. The process according to claim 1, wherein the hydrolysis takes place in a continuous bleaching reactor.

28. The process according to claim 1, wherein mechanical energy input during the hydrolysis is 1-5 kWh per dry ton cellulose.

29. The process according to claim 1, wherein mechanical energy input during the hydrolysis is at most 10 kWh per dry ton cellulose.

30. The process according to claim 1, wherein mechanical energy input during the hydrolysis is at most 20 kWh per dry ton cellulose.

* * * * *